United States Patent

[11] 3,537,549

[72] Inventor Robert G. Ely
8321 Sanders Court, Fresno, California 93702
[21] Appl. No. 784,515
[22] Filed Nov. 21, 1968
Continuation-in-part of Ser. No. 684,749, Nov. 21, 1969, abandoned.
[45] Patented Nov. 3, 1970

[54] FRICTION CONTROL FOR CABLE DRUMS
6 Claims, 9 Drawing Figs.
[52] U.S. Cl. ................................................. 188/77, 188/259, 192/80
[51] Int. Cl. .................................................. F16d 49/10
[50] Field of Search .......................................... 188/77, 26, 58, 259; 192/80

[56] References Cited
UNITED STATES PATENTS
| | | | |
|---|---|---|---|
| 1,478,849 | 12/1923 | Darnell | 188/77 |
| 2,133,074 | 10/1938 | Bixby | 188/77 |
| 2,249,282 | 7/1941 | Wellman | 188/259 |

*Primary Examiner* — George E. Halvosa
*Attorney* — Huebner and Worrel

ABSTRACT: A braking device for achieving graduated control over the rotation of a cable drum or the like consisting essentially of a brake drum, a brake lining and a constrictable brake band supporting the brake lining in operative relation to the brake drum, and a friction pad adjustably mounted on the brake band adapted to engage the brake drum in advance of the brake lining incident to constriction of the brake band.

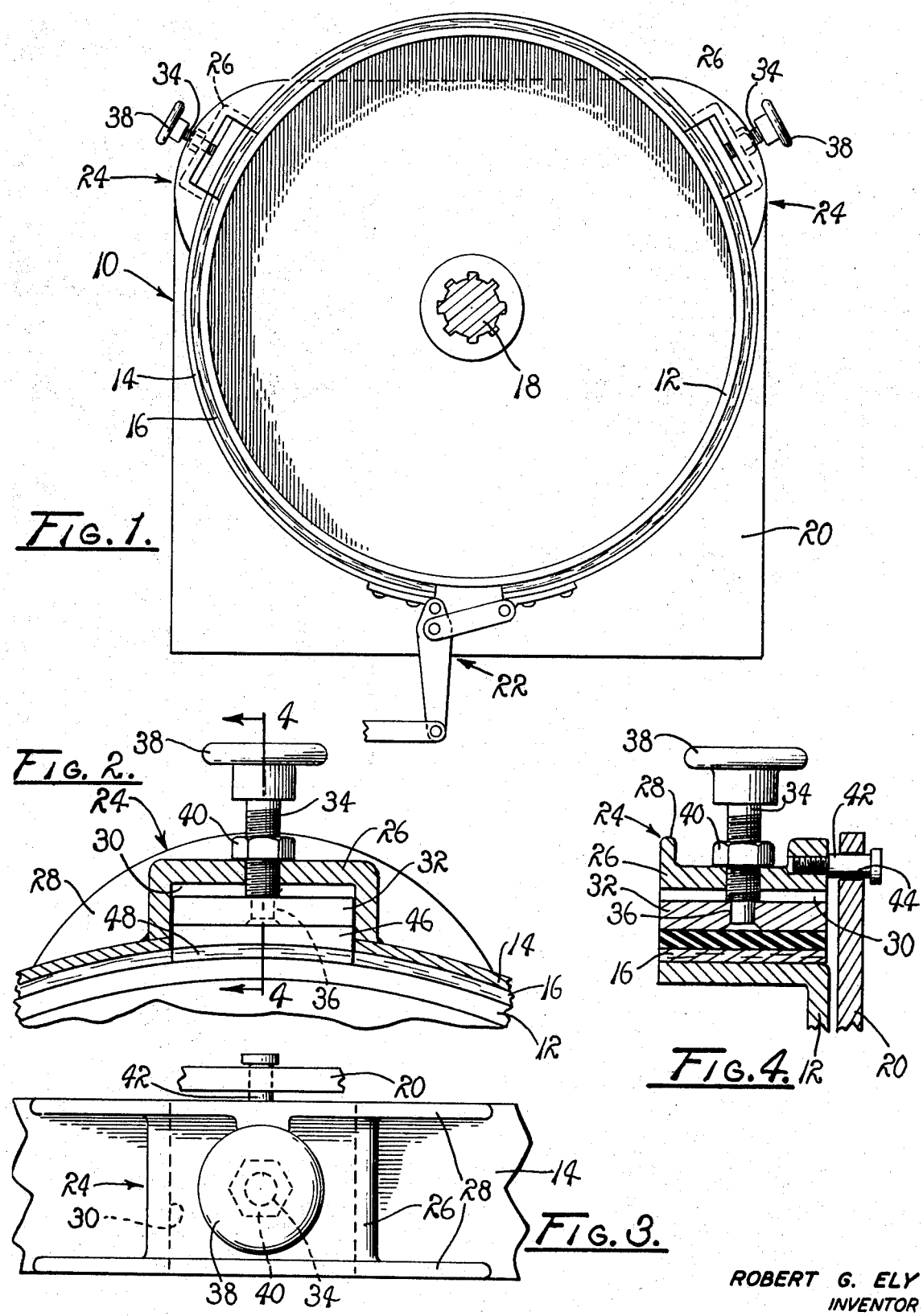

Patented Nov. 3, 1970  3,537,549

ROBERT G. ELY
INVENTOR

Huebner & Worrel
ATTORNEYS

FRICTION CONTROL FOR CABLE DRUMS

CROSS REFERENCE TO RELATED APPLICATION

This application is a continuation-in-part of applicant's copending U.S. Pat. application Ser. No. 684,749, filed Nov. 21, 1967, now abandoned, for "Improved Friction Control For Cable Drums".

BACKGROUND OF THE INVENTION

The present invention relates to a braking device for a cable drum and more particularly to an improved friction control device for controlling the rotation of a cable drum or any other rotary member in a smooth, gradual and precise manner.

Heretofore, cable drums have been equipped with brake devices which consist essentially of a brake drum, a brake band in circumscribing relation thereto and a brake lining supported by the brake band adapted to be brought into braking engagement with the brake drum by constricting the brake band. In the operation of cranes it is highly desirable to control the cable drums precisely in the raising and lowering of items in order that they be delivered to the point of delivery in a safe and reliable manner. However, such desired precision of control has not been uniformly attained for the reason that it is extremely difficult to constrict the brake band with such precision. More often than not, the cable drums revolve rapidly or are grabbed and completely stopped. Furthermore, the transition from rapid rotation to a complete stop occurs in such a brief period of time that severe shock loads are imposed upon the lifting cables with the attendant danger of snapping the cables, thus requiring the use of oversized cables to provide a sufficient factor of safety.

SUMMARY OF THE INVENTION

It is therefore an object of the present invention to provide an improved friction control device for controlling the rotation of a rotary member in a smooth and gradual manner.

Another object is to provide a braking device for cable drums and the like for achieving graduated control of the rotation thereof.

Another object is to provide a braking device substantially uniformly operable in a manner to apply smoothly varying degrees of braking action.

Another object is to provide an auxiliary brake pad in conjunction with a brake lining, which pad is engageable with a brake drum prior to engagement of the lining therewith.

Another object is to provide a braking device of relatively inexpensive construction for control of the rotation of a rotary member, which device operates in a rapid reliable and facile manner to achieve such control.

These and other objects and advantages are achieved by a braking device consisting essentially of a brake drum, a brake band in circumscribing relation to the brake drum which supports a brake lining in operative relation to the brake drum, and a friction pad adjustably mounted on the brake band. In one form, the brake band and the brake lining are segmented, the segments of the brake band being interconnected by a plurality of bridging brackets, each having a rectangular recess slidably receiving a rectangular plate adjustably supported in the recess by a member having one end thereof journaled in the plate and an intermediate portion thereof threadedly engaging the bracket, the plate having secured thereto a pad of resilient material to which a pad of friction material is affixed. In another form of the device, the adjusting mechanism includes a spring for resiliently holding the plate in adjusted position to avoid or minimize overadjustment. Still another form of the device provides an auxiliary friction pad attached to a conventional braking system having a brake band, the pad being mounted for adjustment on the brake band. Thus, by adjustment of the supporting plate, the friction pad can be positioned in closer adjacency to the brake drum than the remainder of the brake lining, initial constriction of the brake band serving first to bring the friction pad into braking contact with the brake drum, continued constriction resulting in increasing the degree of braking action, culminating with the engagement of the brake lining to effect a complete stoppage of the rotation of the brake drum.

BRIEF DESCRIPTION OF DRAWINGS

FIG. 1 is an elevational view of one form of a braking device embodying the principles of the present invention.

FIG. 2 is a fragmentary sectional view of the device on a larger scale.

FIG. 3 is a plan view of the structure of FIG. 2.

FIG. 4 is a vertical sectional view taken generally on line 4-4 of FIG. 2.

DETAILED DESCRIPTION OF THE EMBODIMENTS

First Form

Figure 5:
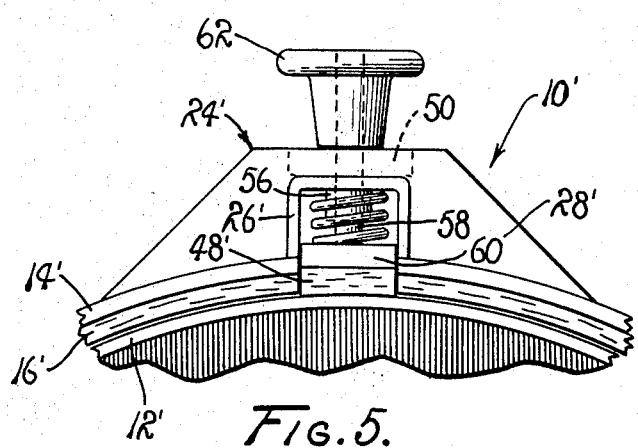
FIG. 5 is a fragmentary elevational view of a modified form of the device.

Referring to FIG. 1, there is illustrated an improved friction control device 10 embodying the principles of the present invention and consisting essentially of a brake drum 12, and a brake band 14 which supports a brake lining 16 in operative relation to the brake drum. The brake drum 12 is fixed to an axle or shaft 18 suitably journaled for rotation in a support standard or bracket 20 and is suitable secured to a cable drum, not shown, whereby the braking action of the device 10 serves to control the rotation of the cable drum. Brake band 14 and brake lining 16 are disposed in circumscribing relation to the brake drum 12, braking action being effected by constriction of the brake band by conventional linkage designated generally by a reference numeral 22 and operating in a well-known manner. The described structure is conventional and familiar to those who operate machines employing cable drums.

The friction control or braking device 10 of the present invention is structurally featured by segmenting the brake band and the brake lining, adjacent ends of the brake band segments being interconnected by bridging brackets 24. Viewing FIGS. 2 and 4, it will be noted that the adjacent ends of the segments of the brake band 14 are spaced apart, the spacing therebetween being bridged by the bridging bracket 24 which includes an arch-like U-shaped member 26, the legs of which are joined to the segments of the brake band 14, such juncture being strengthened by means of arcuate plates or gussets 28. The member 26 is formed to provide a generally rectangular recess 30 in the interior thereof in which a rectangular plate 32 is adjustably supported for radial sliding movement by means of an adjusting screw 34 having one end thereof rotatably connected to the plate 32, as at 36, the other end thereof being provided with a finger knob 38. The intermediate portion of the screw 34 is threadedly connected to the member 26 and to a nut 40 for locking the screw to the member. The brake band 14 is appropriately anchored by means of studs or pins 42 each secured to a member 26 and projecting through a suitable opening 44 in the support bracket 20.

Suitably secured to the underside of the supporting plate 32, as by adhesion, bonding, or the like, is a rectangular pad 46 of rubber, plastic or other suitable resilient material, substantially similarly dimensioned as the plate. The brake lining 16 has segments or portions thereof which are coterminous with the segments of the brake band 14. The gaps between adjacent ends of the segments of brake lining 16 are closed in each instance by a friction pad 48 having substantially the same curvature as the brake lining and providing therewith a substantially continuous braking surface when in alignment therewith. The pad 48 possesses substantially the same rectangular dimensions as plate 32 and pad 46 and is suitably secured to the latter as by adhesion, bonding or the like.

The material of the friction pad can be similar to that of the brake lining. Preferably, however, the pad 48 is made of hemp or the like to provide sufficient friction for the purpose and in addition to clean and slightly lubricate the brake drum, thereby prolonging the life of the friction pad and the drum.

Adjusting screw 34 can be turned to adjust the position of the friction pad 48 in closer adjacency to the brake drum 12 than the brake lining 16. Such positioning of the friction pad provides that, upon initial constriction of the brake band 14, the pad is the first portion of friction material that is brought into braking engagement with the brake drum, further constriction bringing the braking face of the pad into tighter braking engagement and thereby increasing the degree of braking action. The compressibility of the pad 46 aids in increasing the degree of braking action while permitting movement of the pad 48 into alignment with the brake lining 16, whereupon a full braking action is attained. Graduated control of the brake drum 12 and the cable drum to which it is secured is thus achieved for a smooth, gradual and precise control of the rotation of the cable drum. Release of the drum for rapid rotation is also accomplished in a smooth and gradual manner by reversing the procedure first to take the brake lining 16 out of engagement with the brake drum 12 and, lastly, the pad 48, after the degree of its braking action is gradually reduced by the action of the pad 46 in expanding from its compressed condition.

It will be appreciated that the several pads 48 can be differently positioned with respect to the brake drum 12 in order that the braking action from initial to final constriction of the brake band can be made in small increments and that additional bridging brackets and friction pads can be provided to diminish the size of each increment and provide for a greater range of graduated control.

OPERATION OF FIRST FORM

The operation of the first form of the device of the present invention is believed to be clearly apparent and is briefly summarized at this point. With the adjusting screws 34 adjusted to position the pads 48 associated therewith as desired to provide the degree and graduation of control preferred, the cable drum and the brake drum are connected to a source of power and rotated to perform an item handling operation. As the item nears its destination or point of delivery, the linkage 22 is initially actuated to constrict the brake band 14 slightly, which places the pad 48 that is in closest adjacency to the brake drum 12 in braking engagement therewith, thereby exerting a small degree of braking action. Further constriction of the brake band 14 brings the other pad or pads 48 into effective engagement with the brake drum 12 in accordance with their distance therefrom, thereby bringing into play additional surfaces of braking material and increasing the degree of braking action accordingly. Full constriction of the brake band 14 serves to bring the brake lining 16 into contact with the brake drum 12 with such pressure as to brake the drum and its associated cable drum to a full stop. In lowering an item, the linkage 22 is actuated for first releasing the brake band 14 for disengagement of the brake lining 16 and as many of the pads 48 as necessary to have the cable unwind from the cable drum at a desired speed, the disengaged pads and brake lining 16 being reapplied gradually as the item reaches its point of delivery.

Second Form

Referring to FIG. 5, there is shown a modified form of a friction control device 10' embodying the principles of the present invention which is quite similar to the device 10 previously described. Accordingly, corresponding parts are designated by corresponding prime numerals. The device 10' consists essentially of a brake drum 12'and a brake band 14' which supports a brake lining 16' in operative relation to the brake drum. It will be appreciated, of course, that the brake drum is circular and is circumscribed by the lining and the brake band which is suitably supported in operative relation to the brake drum as described in greater detail in connection with the first form of the device.

Figure 6:
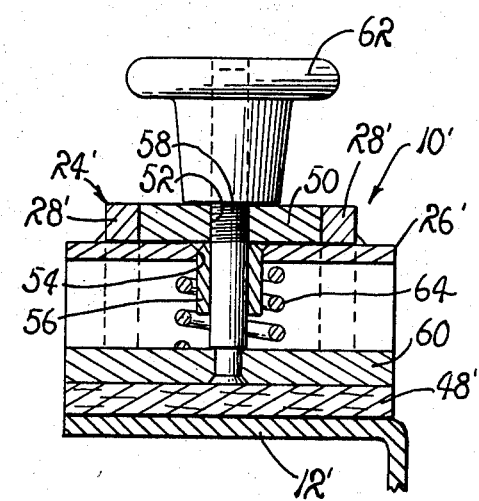
FIG. 6 is an enlarged transverse section of the device of FIG. 5.

The brake lining and the brake band are segmented, the adjacent ends of the brake band segments being interconnected by a bridging bracket 24'which includes an inverted U-shaped channel member 26'. Secured to the member 26' is a pair of parallel plates or gussets 28' of generally trapezoidal shape having lower arcuate edges suitably configured to the curvature of the brake band 14' and secured thereto. The upper portions of the gussets are interconnected by a plate 50 disposed atop the channel member 26'. The plate 50 is perforated to provide an aperture 52. Coaxially aligned with the aperture 52 is a perforation 54 formed in the top of the channel member 26' which is of greater size than the aperture. Disposed in the perforation 54 is one end of a guide sleeve 56 having an outer diameter snugly fitted therein and an inner diameter equal to that of the aperture and aligned therewith, as shown in FIG. 6.

Passing freely through the aligned aperture and sleeve is a rod 58, the upper portion of which is threaded, and to the lower end of which is fixed a rectangular supporting plate 60 fitted for sliding movement within the channel member 26'. Threadedly engaged with the upper portion of the rod 58 is a finger knob 62 for adjusting the position of the plate 60. Surrounding the sleeve 56 is a compression spring 64 which reacts between the channel member and the support plate for biasing the plate toward the brake drum and resiliently holding the plate in adjusted position.

Suitably secured to the underside of the plate 60, as by adhesion, bonding or the like, is a rectangular friction pad 48' substantially similarly dimensioned as the plate and of material similar to that of friction pad 48.

The friction pad 48'is disposed in the gap between adjacent ends of the segments of the brake lining 16'and is adjustable relative thereto. Such positioning of the pad 48'provides that, on initial constriction of the brake band 14', the pad is the first portion of friction material that is brought into braking engagement with the brake drum 12', further constriction bringing the pad into tighter braking engagement and thereby increasing the amount of braking action for gradually slowing down the rotation of the brake drum and parts connected thereto. The compressibility of the spring 64 aids in increasing the braking action slightly while permitting movement of the pad into alignment with the brake lining 16'whereupon a full braking action and complete stoppage of the drum is attained. The compressibility of the spring also permits inward movement of the pad during the braking action into alignment with the brake lining for minimizing undue wear on the pad because of any overadjustment thereof.

OPERATION OF SECOND FORM

The operation of the second form of the device is briefly summarized. With the finger knob 62 adjusted to position the friction pad 48' relative to the brake lining 16' as desired to provide the degree of graduation of control preferred, the brake drum is connected to a source of power and rotated to perform an item handling operation. As the item nears its destination or point of delivery, the brake band 14'is initially constricted which places the friction pad 48' in braking engagement with the drum 12', thereby exerting a small degree of braking action. Further constriction of the brake band brings the pad into tighter engagement with the drum, thereby increasing the degree of braking action accordingly. Full constriction of the brake band serves to bring the brake lining into contact with the drum with such pressure as to brake the drum to a full stop. In lowering an item, the brake band is initially released slightly for disengagement of the brake lining from the drum and a reduction in the braking action of the pad 48', as necessary to have the brake drum rotate at a desired speed, the degree of braking action of the pad being increased and the brake lining being reapplied gradually as the item reaches its point of delivery.

Third Form

Figures 7, 8:
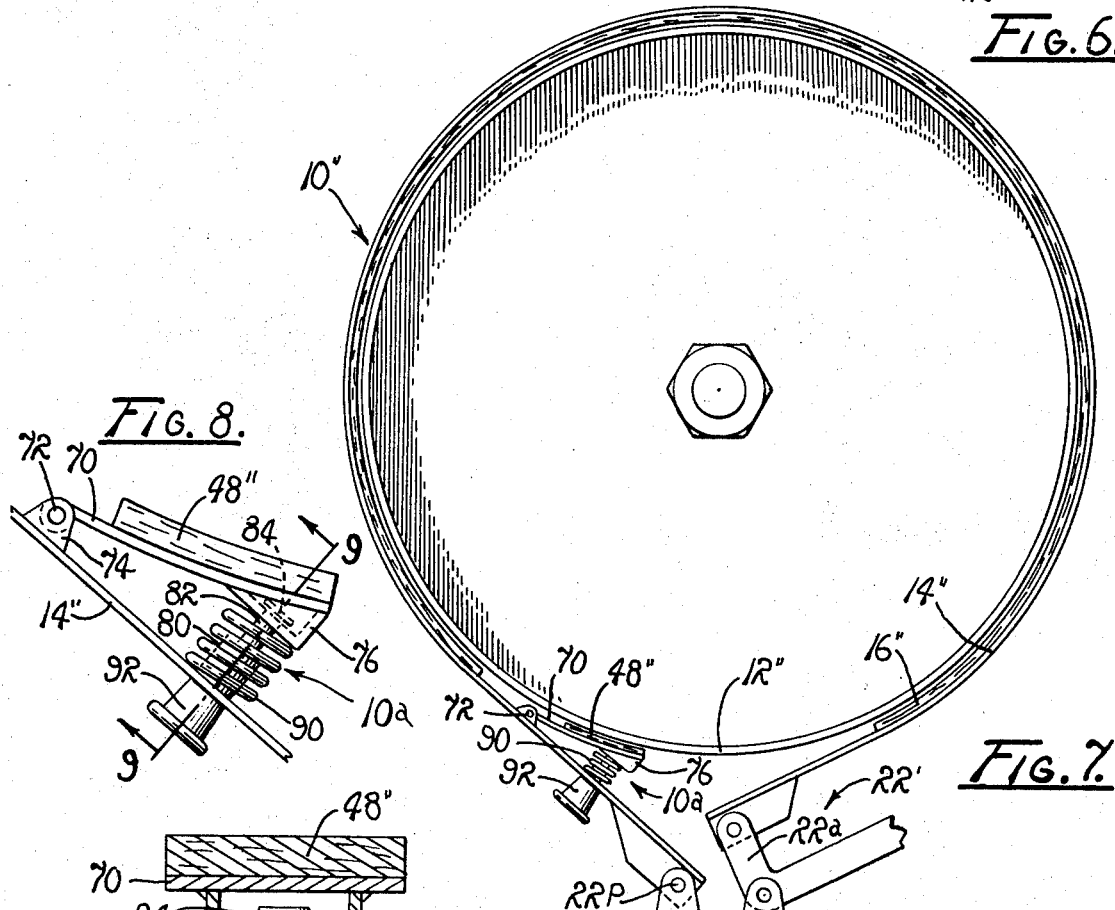
FIG. 7 is a fragmentary elevational view of a conventional braking arrangement having a brake band and illustrating the manner of adjustably mounting a friction pad attachment thereon.
FIG. 8 is an enlarged elevational view of the friction pad attachment of FIG. 7.

Referring to FIG. 7, there is shown a third form of the improved friction control device 10" of the present invention which includes an auxiliary brake attachment 10a associated with a conventional brake system having a brake drum 12" about which is a brake band 14" supporting a brake lining 16". The lining is placed into and out of engagement with the drum in the usual manner by the action of an actuating linkage 22' which includes a swinging arm 22a and a pivot 22p. As will be appreciated from viewing FIG. 7, clockwise swinging of the arm 22a causes the brake lining to be disengaged and spaced from the brake drum, reverse movement of the arm serving to engage the lining with the drum.

Inviting attention also to FIG. 8, the attachment 10a includes a supporting plate 70 connected at one end thereof for pivotal movement relative to the brake band by means of a pivot pin 72 and a bracket 74 fixed to the brake band 14'. A friction pad 48" is suitably secured to the plate 70 as by adhesion, bonding or the like. The pad 48" can be made of any suitable material but is preferably made of hemp or the like for reasons stated in connection with the friction pad 48. The plate 70 and the pad 48" can be arcuately configured to provide for engaging the pad effectively with the brake drum when the attachment is moved toward the brake drum on appropriate actuation of the arm 22a to swing the other end of the brake band inwardly about the pivot 22p.

Figure 9:
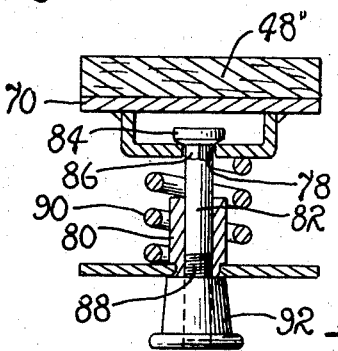
FIG. 9 is an enlarged sectional view taken on line 9-9 of FIG. 8.

To achieve a braking action by the pad 48" ahead of the brake lining 16", provision is made for adjustment of the pad to place it slightly radially inwardly of the brake lining. For this purpose, the support plate 70 has fixed thereto a bracket 76. As shown in FIG. 9, the bracket 76 has a noncircular perforation 78 which is in substantial alignment with a guide sleeve 80 secured to the brake band 14". Passing through the sleeve 80 and the perforation 78 is a rod 82 having a head 84, a noncircular shank portion 86 adjacent to the head and a distal threaded end 88. Disposed about the sleeve 80 and reacting between the bracket 70 and the brake band 14" is a compression spring 90. Threadedly engaged with the threaded end of the rod is a finger knob 92, the rotation of which adjusts the position of the pad 48". The spring serves to hold the pad 48" resiliently in such adjusted position for minimizing wear of the pad resulting from any overadjustment thereof. The perforation 78 is slightly oversize to permit articulation of the plate 70 relative to the rod 82 while preventing rotation of the latter.

OPERATION OF THIRD FORM

The operation of the third form of the device of the present invention is likewise believed to be apparent. With the pad 48" adjusted to provide for desired advance engagement thereof ahead of the brake lining 16", actuation of the linkage 22' to cause inward swinging of the brake band about the pivot 22p first engages the pad to achieve a small degree of braking action. Further constriction of the brake band brings the brake lining gradually into effective engagement with the brake drum for gradual controlled stopping thereof. Reverse actuation of the linkage provides for obtaining the same gradual effect in the opposite direction.

There have thus been provided different forms of an improved friction control or braking device of inexpensive construction by which graduated control of the rotation of the cable drum or other rotary member can be achieved in a smooth, rapid, reliable and facile manner.

Although the invention has been herein shown and described in what are conceived to be the most practical and preferred embodiments, it is recognized that departures may be made therefrom within the scope of the invention.

I claim:

1. Means for braking the rotation of a rotary member comprising a brake band, a brake lining of arcuate curvature supported on the band for movement relative to the member, said lining being in sections, said brake band having mounted thereon a bridging bracket with substantially rectangular dimensions, a generally rectangular plate adjustably slidably supported within the bracket, one of said sections having substantially the same dimensions as the plate and being secured thereto for movement therewith for selective adjustment and placing said one section out of arcuate alignment with the remainder of the lining.

2. The braking means of claim 1 in which said one section is secured to the plate by a pad of compressible material.

3. A friction control device comprising a brake drum mounted for rotation; a brake band mounted in operative relation to the drum; a brake lining secured to the band providing spaced segments disposed about the drum, said band being adapted to be constricted to effect engagement of the lining with the drum for controlling the rotation of the drum; a pad of friction material mounted on the band in inwardly spaced relation to said lining to provide a braking surface engageable with the drum prior to engagement of the lining therewith incident to said constriction of the band; resilient means biasing said pad toward the drum but permitting retraction of the pad into alignment with the lining upon engagement of the lining with the drum, said brake band including a pair of sections having a gap therebetween; a bracket interconnecting the sections and bridging the gap; and a support plate mounting said pad on the bracket for movement within the gap along an axis extending substantially radially of the band and lining.

4. The device of claim 3 in which the support plate has connected thereto a rotatable member screw-threadedly engaging the bracket for selective adjustment of the plate and pad.

5. The device of claim 3 in which the support plate has secured thereto a nonrotatable screw-threaded member, means biasing the plate toward the drum, and means engaging the screw-threaded member and bracket for moving the plate against the bias of the biasing means.

6. The device of claim 5 in which the screw-threaded member is a rod, and the biasing means is a compression spring surrounding the rod and reacting between the bracket and the plate.